(12) United States Patent
Rabinovich et al.

(10) Patent No.: US 12,306,741 B2
(45) Date of Patent: May 20, 2025

(54) ADJUSTING CHAT BOT DESIGN BASED ON MATCHED ESCALATION LOGS

(71) Applicant: International Business Machines Corporation, Armonk, NY (US)

(72) Inventors: Ella Rabinovich, Haifa (IL); David Boaz, Bahan (IL); Inbal Ronen, Haifa (IL); Ofer Lavi, Tel Aviv (IL); David Amid, Modiin (IL); Segev Shlomov, Haifa (IL); Ateret Anaby-Tavor, Givat Ada (IL)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 17/495,488

(22) Filed: Oct. 6, 2021

(65) Prior Publication Data
US 2023/0108637 A1   Apr. 6, 2023

(51) Int. Cl.
*G06F 11/362* (2025.01)
*G06F 16/355* (2025.01)
*G06F 18/22* (2023.01)
*G06F 40/35* (2020.01)
*H04L 51/02* (2022.01)

(52) U.S. Cl.
CPC .......... *G06F 11/366* (2013.01); *G06F 16/355* (2019.01); *G06F 18/22* (2023.01); *G06F 40/35* (2020.01); *H04L 51/02* (2013.01)

(58) Field of Classification Search
None
See application file for complete search history.

(56) References Cited

U.S. PATENT DOCUMENTS

| | | | |
|---|---|---|---|
| 11,194,973 B1 * | 12/2021 | Goel | G06N 3/08 |
| 2016/0099892 A1 | 4/2016 | Palakovich et al. | |
| 2017/0293834 A1 * | 10/2017 | Raison | G06F 40/40 |
| 2017/0322939 A1 * | 11/2017 | Byron | G06N 20/00 |
| 2018/0365212 A1 * | 12/2018 | Banerjee | H04L 51/02 |
| 2019/0182382 A1 * | 6/2019 | Mazza | H04M 3/527 |
| 2019/0215283 A1 * | 7/2019 | Nahum | G06F 40/134 |
| 2019/0311036 A1 * | 10/2019 | Shanmugam | G06F 40/56 |
| 2019/0384794 A1 | 12/2019 | Holly, Jr. et al. | |
| 2020/0137001 A1 * | 4/2020 | Wu | G06F 40/35 |
| 2020/0137002 A1 * | 4/2020 | Chavda | G06N 20/00 |
| 2020/0327327 A1 * | 10/2020 | Wu | G06N 20/10 |

OTHER PUBLICATIONS

Authors et al., Disclosed Anonymously, "Method to Reduce the Number of Questions Asked Due to Conversation Handoffs Between Agents", An IP.com Prior Art Database Technical Disclosure, Published Apr. 23, 2021, 5 pages.

(Continued)

*Primary Examiner* — Qing Chen
(74) *Attorney, Agent, or Firm* — Jared C. Chaney

(57) ABSTRACT

An example system includes a processor to receive a bot design and escalation logs associated with a chat bot configured based on the bot design. The processor can compute a similarity score between each of a number of bot response nodes in the bot design and the escalation logs. The processor can generate a sorted list of the bot response nodes in the bot design based on the similarity scores.

20 Claims, 8 Drawing Sheets

(56) References Cited

OTHER PUBLICATIONS

IBM Cloud Docs, https://cloud.ibm.com/docs/assistant?topic=assistant-deploy-intercom, Retrieved Jun. 27, 2021, 14 pages.
IBM Cloud Docs, https://cloud.ibm.com/docs/assistant?topic=assistant-irrelevance-detection, Retrieved: Jun. 27, 2021, 6 pages.
Mell et al., "The NIST Definition of Cloud Computing", National Institute of Standards and Technology, Sep. 2011, Special Publication 800-145, 7 pages.
Mishra et al., "Using Amazon Lex Conversation logs to monitor and improve interactions", AWS Machine Learning Blog, Published Dec. 19, 2019, https://aws.amazon.com/blogs/machine-learning/using-amazon-lex-conversation-logs-to-monitor-and-improve-interactions/, Retrieved Jun. 27, 2021, 10 pages.
Sandbank et al., "Detecting Egregious Conversations between Customers and Virtual Agents", Apr. 16, 2018, 10 pages.
Shukla et al. "Conversation Learner—A Machine Teaching Tool for Building Dialog Managers for Task-Oriented Dialog Systems", ACL Anthology, Proceedings of the 58th Annual Meeting of the Association for Computational Linguistics: System Demonstrations, Jul. 10, 2020, pp. 343-349, 10.18653/v1/2020.acl-demos.39.

* cited by examiner

ADJUSTING CHAT BOT DESIGN BASED ON MATCHED ESCALATION LOGS

BACKGROUND

The present techniques relate to bot design. More specifically, the techniques relate to bot design of chat bots.

SUMMARY

According to an embodiment described herein, a system can include processor to receive a bot design and escalation logs associated with a chat bot configured based on the bot design. The processor can also further compute a similarity score between each of a number of bot response nodes in the bot design and the escalation logs. The processor can also generate a sorted list of the bot response nodes in the bot design based on the similarity scores.

According to another embodiment described herein, a method can include receiving, via a processor, a bot design and escalation logs associated with a chat bot configured based on the bot design. The method can further include selecting, via the processor, sections of conversations in escalation logs for matching. The method can also further include computing, via the processor, a similarity score between each of a number of bot response nodes in the bot design and the escalation logs. The method can also include sorting, via the processor, the bot response nodes by the accumulated similarity score generate a sorted list of the bot response nodes.

According to another embodiment described herein, a computer program product for sorting bot response nodes can include computer-readable storage medium having program code embodied therewith. The computer readable storage medium is not a transitory signal per se. The program code executable by a processor to cause the processor to receive a bot design and escalation logs associated with a chat bot configured based on the bot design. The program code can also cause the processor to select sections of conversations in escalation logs for matching. The program code can also cause the processor to compute a similarity score between each of a number of bot response nodes in the bot design and the escalation logs. The program code can also cause the processor to sort the bot response nodes by the accumulated similarity score generate a sorted list of the bot response nodes.

DETAILED DESCRIPTION

Figure 1:
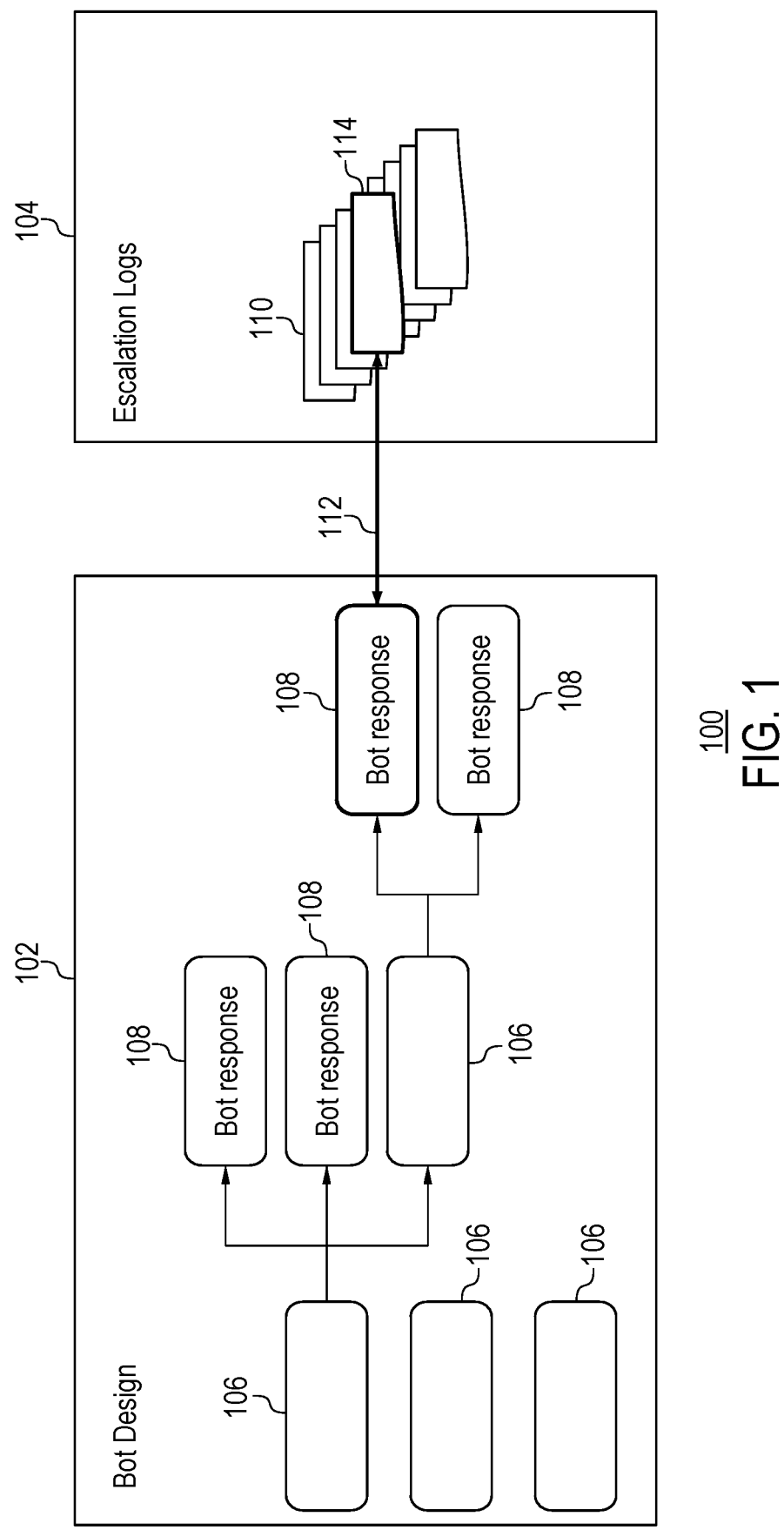
FIG. 1 is a block diagram of an example system for flagging bot responses for potential modification based on matched escalation logs.

Task-oriented dialogue systems aim at assisting a user to complete a certain task. For example, a task may be booking a hotel, performing account operations, searching information about transportation, among other tasks. Some rule-based systems may deploy a module for interpreting the user's initial request, referred to as intent identification, followed by extracting relevant information required for performing the task, and ultimately fulfilling the mission by performing an action or providing the user with information. For example, the information provided may be guidance on setting up a new device.

Some task-oriented dialogue systems involve a step of passing a conversation to a human agent, referred to herein as escalation, upon failure of a bot to satisfy a user. Various reasons can lead to such failure, including misinterpretation of initial user request, failure to understand the specificities of the request, and consequently, invocation of an inappropriate execute path. In some cases, even if the user ultimately received the intended response from the system, the system may have a failure to satisfy the user's need due to, missing, or alternatively, unfocused, too broad, unspecific content, or otherwise insufficient content, among other reasons. In latter cases, the escalated conversation is likely to converge to a human agent's response suggesting a customer a similar guidance, set of instructions, or pointers as modeled in the bot per the same request. The resulting escalations may be stored in the form of an escalation logs. Because human agents are expensive and involve more time and effort for the user, these escalations may sought to be minimized.

The benefits of exploration of escalation logs for bot design improvement may not be fully exploited today due to a variety of reasons. For example, the lack of inherent integration between these two often distinct systems may make such exploration difficult. In addition, it may be inherently difficult to automatically extract actionable insights from the two seemingly unrelated resources: bot design and escalation logs. For example, different units occasionally employ separate systems to handle these two parts of essentially the same conversation: human-to-bot (H2B) systems and their escalated continuation—human-to-human (H2H) systems. In some cases, the H2H conversations may not be able to be linked back to their H2B counterparts due to the lack of a unique identifier connecting between the two systems. Consequently, analysis of failures, including derivation of action items for failure fixes, may be executed for each part in isolation. For example, such analysis may be performed through manual pass over a focused set of escalated conversations without reference to the bot design.

According to embodiments of the present disclosure, a system includes a processor that can receive a bot design and escalation logs associated with a chat bot configured based on the bot design. The processor can compute a similarity score between each of a number of bot response nodes in the bot design and the escalation logs. The processor can further generate a sorted list of the bot response nodes in the bot design based on the similarity scores. Thus, embodiments of the present disclosure allow bridging the gap in knowledge transfer between domain expertise and a bot design by establishing direct connection between these separate systems via an automatic matching between the content of escalated conversations with textual replies modeled in a bot. In particular, content that is frequently found in escalation logs that is also modeled in a bot may be used to highlight potential pain points related to processes aimed for automation, but not being exploited as such at full capacity. The fixing, revision, or extension of such design items may bring an immediate impact on bot containment, which refers to the ability of a bot to successfully complete a conversation without escalation. In addition, in some embodiments, a complementary analysis may reveal content that is frequently discussed in escalation logs but may be poorly covered or completely uncovered by the bot, and suggest possible novel topics that can be considered for automation. The techniques described herein therefore enable examination of the content of escalation logs with respect to existing bot design, so as to identify potential issues of two types, including sub-optimal design of existing bot content, and missing content with potential for automation. In experiments, at least 20% of output flagged bot responses were subsequently determined to be appropriately referred for modification.

With reference now to FIG. 1, a block diagram shows an example system for flagging bot responses for potential modification based on matched escalation logs. The example system 100 of FIG. 1 includes a bot design 102. For example, the bot design 102 may be a task-oriented dialogue system, such as a question answering system. In some examples, the bot design 102 may be a textual object, such as a JSON object. The system 100 includes a collection 104 of escalation logs. For example, the collection 104 of escalation logs may be received from one or more H2H conversations. In various examples, the collection of escalation logs 104 may be logs on the agent side. The bot design 102 may be a tree representing an execution flow that includes a set of nodes 106 and bot response nodes 108. For example, the nodes 106 may include routing nodes with conditions and intermediate actions to be taken by a bot based on the conditions. In various examples, the bot response nodes 108 may include a textual response to be provided to an end user in response to a given input request. In various examples, the bot design 102 may include indicators for each of the bot response nodes 108 as to whether each bot response node 108 is a textual response node or not. The collection 104 includes escalation logs 110 associated with individual interactions between one or more agents and users. The system 100 includes a semantic similarity comparison 112 performed between bot responses 108 and the escalation logs 110. The escalation logs 110 further include at least one high similarity log 114 that has a similarity score that exceeds a threshold.

In the example of FIG. 1, the system 100 may address sub-optimal design of existing bot content in the bot design 102 by matching the content of escalation logs 110 to bot response nodes 108 in the bot design 102 exhibiting high semantic similarity. In particular, the system 100 may identify bot response nodes 108 with high textual overlap with escalation logs 110. Providing the same solution that an agent did to the user request may imply modeled solutions that have not been exploited sufficiently during the automatic step as they still led to an escalation. Thus, the system 100 can assign bot response nodes 108 a score according to their accumulative similarity to conversations in the escalation logs 110. Nodes scored highly may be identified as pain points that may be further analyzed and potentially modified.

In various examples, bot design 102 may be a dialogue system represented by a set of building blocks, where the common constructs include intents, entities, conditions and responses or actions. In various examples, the bot design 102 may be modeled as an execution graph that starts with identification of the relevant intent based on the initial user request 106. For example, the initial user request 106 may be "how can I transfer my sim card into another device?". The bot design 102 may branch into various execution paths and transitions between dialogue states represented as nodes in a path based on matching content derived from user utterances with predefined conditions. As an example, in some of the nodes 106, the bot design 102 may be configured to ask "is that a nano or a micro SIM card" in order to route the execution flow accordingly. In various examples, a dialogue interaction may culminate in a bot response node 108 returning the user a textual response replying to the request. In some examples, a bot response node 108 may include a set of instructions on how to perform a required action. For example, a bot response node 108 may include a guidance on transferring a sim card into another mobile device.

In some examples, one or more bot responses nodes 108 may have be insufficient for various users during operation of the chat bot. The users may have escalated an issue to an agent. The resulting conversations may be stored as escalation logs 104. In some examples, agents may be equipped with canned responses. These canned responses may be predetermined instructions prepared in advance for addressing common requests, so as to facilitate efficiency and compliance with organization regulations during agent interaction with a client. Commonly drawn from the same documentation resources, these canned responses may thus resemble those supposed to be returned by the automatic chat bot system upon similar user requests.

In various examples, the system 100 may leverage the fact that similar user requests typically entail similar responses on bot and agent sides to perform a matching 112 of escalation logs with bot response nodes 108 including textual replies, also referred to herein as textual nodes. The system 100 may ultimately identify bot response nodes 108 whose textual content is repeatedly found in agent replies within the escalation logs 110. In various examples, the bot design-to-logs matching may be performed by computing semantic similarity between textual bot response nodes 108 and the content of escalation logs 110. The matching task may address challenges stemming from the inherently different nature of text including well-formed official language that is modeled in a bot versus user-agent conversations, which may be a noisy combination of spoken and written modalities, including greetings, thanks and unrelated information. In particular, three issues addressed during content matching may include: handling often domain-specific fluff utterances in escalated conversations, selecting relevant user-agent conversation's sections for matching, and selecting a relevant section in a bot reply for matching. As used herein, a fluff utterance refers to a word or phrase of little or no importance to a particular topic of a conversation.

Some contemporary approaches for measuring semantic similarity between two documents assume uniform significance of all of a document's parts for the task at hand. However, this may not be the case when considering user-agent conversation within escalation logs 110. For example, greetings, thanks, ands additional statements like "give me a second", "let me check" may be of little importance for the task at hand. Thus, in various examples, the system 100 may first filter out fluff utterances within the escalation logs 110 that may introduce noise into the process. In some example, the fluff utterances may be detected using a classifier trained to detect fluff utterances. For example, the classifier may be trained using training data (not shown) that includes conversation logs related to the particular bot design 102. For example, the classifier may be implemented using logistic regression, a support vector machine (SVM), decision trees, or any suitable customized solution. In various examples, once trained on the training data, the classifier may receive conversation logs 108 and output relevant portions of each of the conversation logs 108 that do not include any fluff utterances.

Moreover, focusing on different parts of a human-to-human (H2H) conversation in an escalation log 110 may yield different matching results. In various examples, all or part of the H2H conversations in the escalation logs 110 may be compared after being filtered for fluff utterances. For example, both the user and agent side may be used in full after filtered for fluff utterances. In various examples, only the agent side of each conversation, both user and agent side of each conversation, or only the first user request plus the filtered agent side parts of the conversations may be used for matching. For example, the system 100 may use an approach in which a first user utterance that initiated the escalation conversation plus all agent side conversation is included in selecting relevant user-agent conversation sections from the escalation logs 110 for matching with text in each bot response node 108. For example, all agent side utterances filtered for fluff utterances and the very first user utterance to the agent may be extracted from each escalation logs 110. In various examples, the different portions of H2H conversations may be extracted specific to the particular use case and chat bot being deployed.

Similarly, different sections of a bot response node 108 may be of varying importance. For example, the first sentence or paragraph may often concisely summarize the full reply. As one example, a first sentence may be: "Please see below the guidance for initiating the process of user transfer". In other cases, an entire reply of a particular bot response node 108 may be of uniform importance. In various examples, the system 100 may use a fusion between these two approaches. For example, the system 100 can combine the similarity score obtained by using only first sentence or paragraph of the bot response with the score obtained by using the entire bot response. In various examples, the scores may be combined using any suitable technique, such as a CombSUM algorithm that normalizes the different scores before combining them. As in the extraction of portions of the escalation logs 108, the different portions of the bot response node 108 may be extracted specific to the particular use case and chat bot being deployed.

Once the decisions above are made, the system 100 may then compute a similarity between bot response node 108 and escalation logs 110 using a distributional semantics approach. A distributional semantics approach may include encoding texts into a representation in a vector space and then comparing two texts. For example, the encoded texts may each be represented by a vector of real numbers. In various examples, the similarity score generation may yield a score in the 0-1 range. For example, higher similarity scores may reflect higher semantic similarity.

In various examples, the system 100 can calculate a final accumulative similarity score for each bot response node 108 reflecting its content presence in escalation logs 110 by summing up similarity scores obtained by pairwise comparisons of the node with logs 110 in a collection 104. Bot response nodes 108 associated with higher numbers of high similarity score logs 114 may thus receive the highest accumulative similarity scores. Nodes with accumulative scores exceeding a first threshold may be indicative of potential design issues. For example; the high score indicates that the issue re-occurred in logs, boosting the final accumulative score. Nodes with accumulative scores below a second lower threshold may also be indicative of issues. Therefore, in some examples, the system 100 may flag bot response nodes 108 with high accumulative scores for further inspection and potential modification by a conversation analyst. In some examples, the system 100 can flag bot response nodes 108 to be automatically modified in response to predetermined conditions. In various examples, the bot design nodes 108 may be sorted by accumulative similarity scores and output as a sorted list. As one example, the system 100 may use the following algorithm:

1. input: bot design and escalated conversations
2. output: bot response nodes sorted by their recurrence volume in escalation logs
3. for each escalated conversation:
4. filter out fluff utterances
5. extract first user utterance (request) and agent utterances
6. identify agent's solution section(s)
7. #end for
8. for each response-node N, set N_score=0
9. for each response-node and preprocessed conversation pair (N, C):
10. compute full text semantic similarity
11. compute preprocessed conversation to first-node-sentence semantic similarity
12. f_score=fusion of the two scores above
13. N_score=N_score+f_score
14. #end for
15. sort bot design nodes by their accumulative similarity score to logs where the escalated conversations may be received in the form of escalation logs 106, the recurrence volume may be measured by the accumulative similarity score, and the preprocessed conversation may be an escalated conversation processed by steps 3-7. The full text semantic similarity may include computing a vector representing full text of each response-node and each preprocessed conversation pair and comparing the calculated vectors for similarity.

As another example, a sample node-conversation match, where accurately overlapping set of instructions as for completion of a task related to reporting time-off for a user is modeled in the bot response node and is provided by a human agent in the actual conversation log. For example, the bot may have received the following user request: "How do I mark my user off sick in the HR application?" The request may have been misunderstood by the bot handling human resources requests, despite an accurate solution that is described in another bot design path beginning with "Here are the directions to Enter time/Time Off/LOA for a user . . . ". The conversation may then have been escalated to a human agent, who provided the user with essentially the same set of instructions as that in the bot response node 108. In that case, both the bot response node 108 and the conversation (H2B+H2H) in the escalation logs 110 may be shown to a bot designer for analysis of the bot's failure, and possible fix of the bot design. Further analysis of this escalation log 110, in particular investigation of its H2B part, may reveal that the system failed to interpret the user's request "how do I mark my user sick off in the HR system?", thereby resulting in conversation escalation to a human agent. In some examples, the designer may tune the intent detection component to correctly handle the user query. In some examples, if the intent was interpreted properly, the designer may investigate why the bot did not transfer the user to the path with the bot response node 108 corresponding to the right answer.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional bot designs, bot responses, or additional escalation logs, high similarity logs, etc.).

Figure 2:
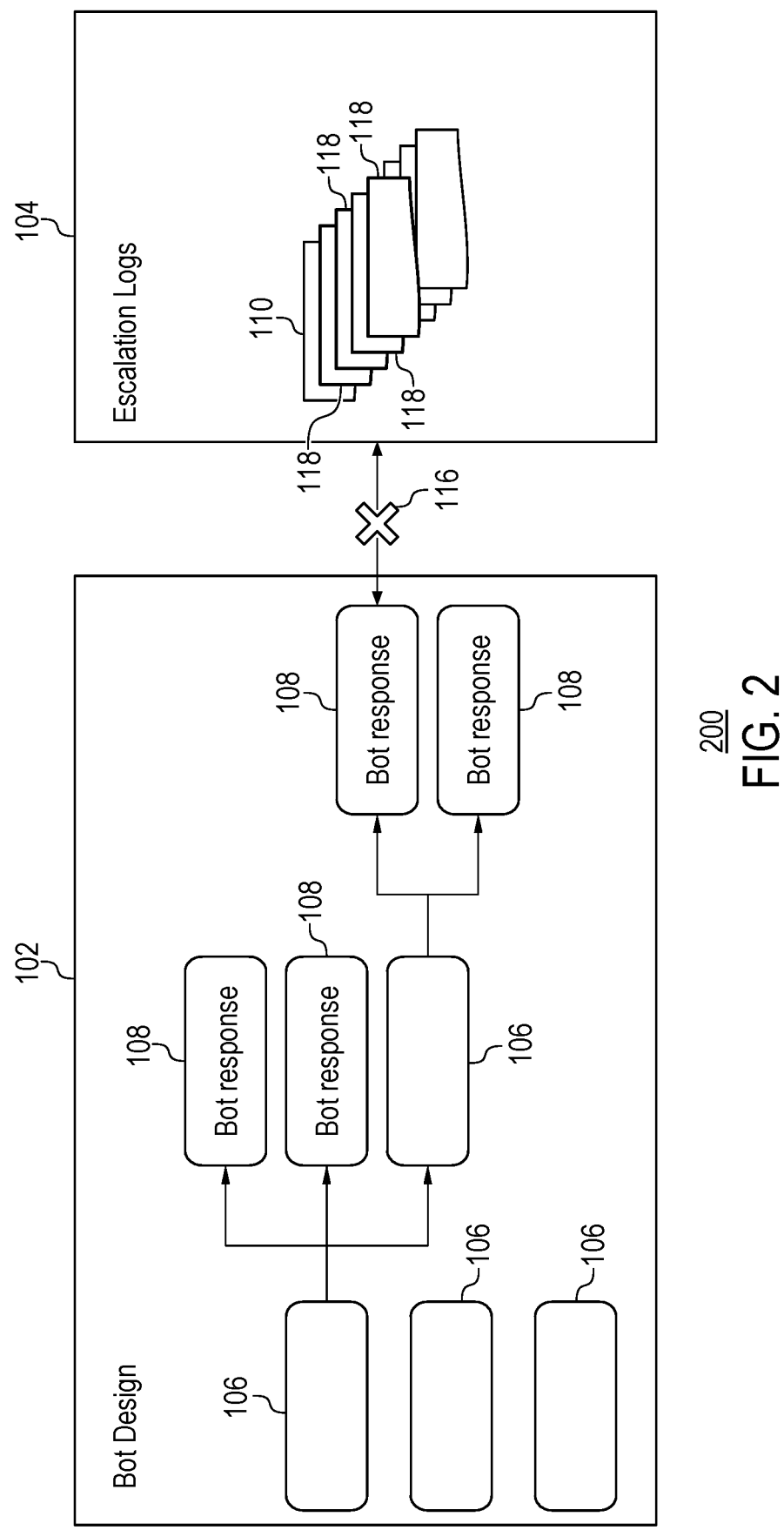
FIG. 2 is a block diagram of an example system for modifying a chat bot design based on clustering of escalation logs.

With reference now to FIG. 2, a block diagram shows an example system for modifying a chat bot design based on clustering of escalation logs. The example system 200 of FIG. 2 includes similarly numbered elements of FIG. 1. In addition, the system 200 includes a matching 116 that focuses on identification of escalation logs 118 that do not match any bot response 108.

In various examples, in contrast to system 100, the system 200 may focus on identification of content not covered by the bot response nodes 108. For example, the system 200 may use a procedure that could facilitate the detection of novel topic candidates for modeling within the bot. Drawing from the same matching as system 100, the system 200 can instead identify conversations with very low semantic similarity to any given textual node in the design. For example, the semantic similarity scores of such conversations may be below a predetermined threshold. In some examples, the system 200 can cluster conversations of low semantic similarity by topic and return a cluster of conversations 118. In various examples, the cluster may correspond to a new topic that may be automatically or manually added to the bot design 102. In some examples, the system 200 may detect that the new topic is out-of-scope and the bot design 102 may be accordingly modified to flag corresponding user requests as out-of-scope.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional bot designs, bot responses, or additional escalation logs, etc.).

Figure 3:
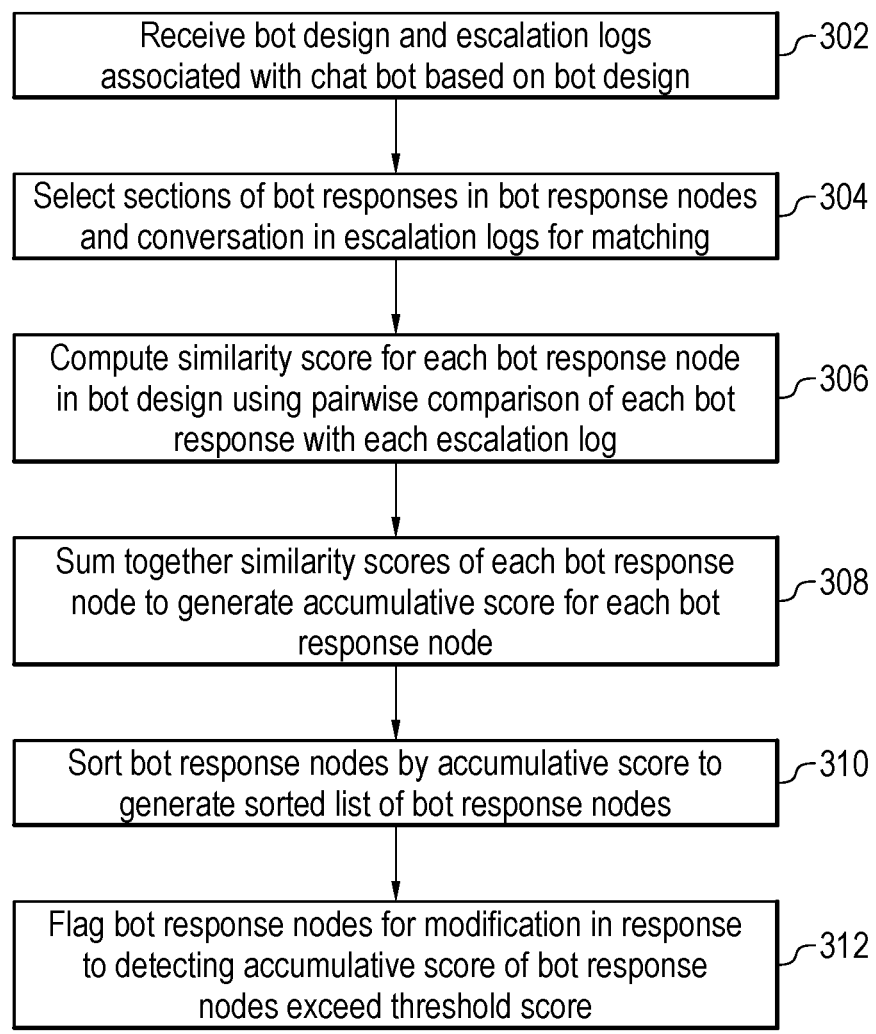
FIG. 3 is a block diagram of an example method that can flag bot responses for potential modification based on matched escalation logs.

FIG. 3 is a process flow diagram of an example method that can flag bot responses for potential modification based on matched escalation logs. The method 300 can be implemented with any suitable computing device, such as the computing device 500 of FIG. 5 and is described with reference to the system 100 of FIG. 1. For example, the method 300 described below can be implemented by the processor 502 or the processor 802 of FIGS. 5 and 8.

At block 302, a processor receives a bot design and escalation logs associated with a chat bot based on the bot design. For example, the chat bot may have been configured based on the bot design and the escalation logs generated by a user requesting an escalation in response to a bot response.

At block 304, the processor selects sections of bot responses in the bot response nodes and conversation in escalation logs for matching. For example, the processor can select sections in the bot design for matching based on a first sentence or paragraph of each textual bot response, or may select the entire response. In some examples, the processor can select sections of conversation in each escalation log based on speaker, or the first sentence. In various examples, the processor can filter fluff utterances from the conversations. For example, the selection portion of the conversations may be the first sentence of the user and all the filtered or unfiltered responses of an agent.

At block 306, the processor computes a similarity score for each bot response node in the bot design using a pairwise comparison of each bot response node with each escalation log. For example, each selected section of each bot response may be paired with each selected section of conversation in each of the escalation logs. Thus, the processor can generate a similarity score for each bot response and escalation log combination. In various examples, the similarity score may be a value ranging from zero to one. In various examples, the processor may compute a full semantic similarity between each of a number of bot response nodes in the bot design and the escalation logs. In some examples, the processor can compute a conversation to first-node-sentence semantic similarity. In various examples, the processor can compute a fusion of a full semantic similarity and a conversation to first-node-sentence semantic similarity between each of a number of bot response nodes in the bot design and the escalation logs.

At block 308, the processor sums together similarity scores of each bot response node to generate an accumulative score for each bot response node. For example, the similarity scores may be added together to generate an accumulative score for each of the bot responses that reflects how many matches a bot response has as well as how close the matches were.

At block 310, the processor sorts the bot response nodes by accumulative score to generate a sorted list of bot response nodes. For example, higher accumulative scores may be sorted higher in the list.

At block 312, the processor flags bot response nodes for modification in response to detecting that the accumulative score of the bot response nodes exceeds a threshold score. For example, the flagged bot responses may be reviewed and modified by a conversation specialist. In some examples, the flagged bot responses may be automatically modified based on predetermined conditions.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the processor can modify one or more bot response nodes in response to receiving a modification request from a conversation specialist.

Figure 4:
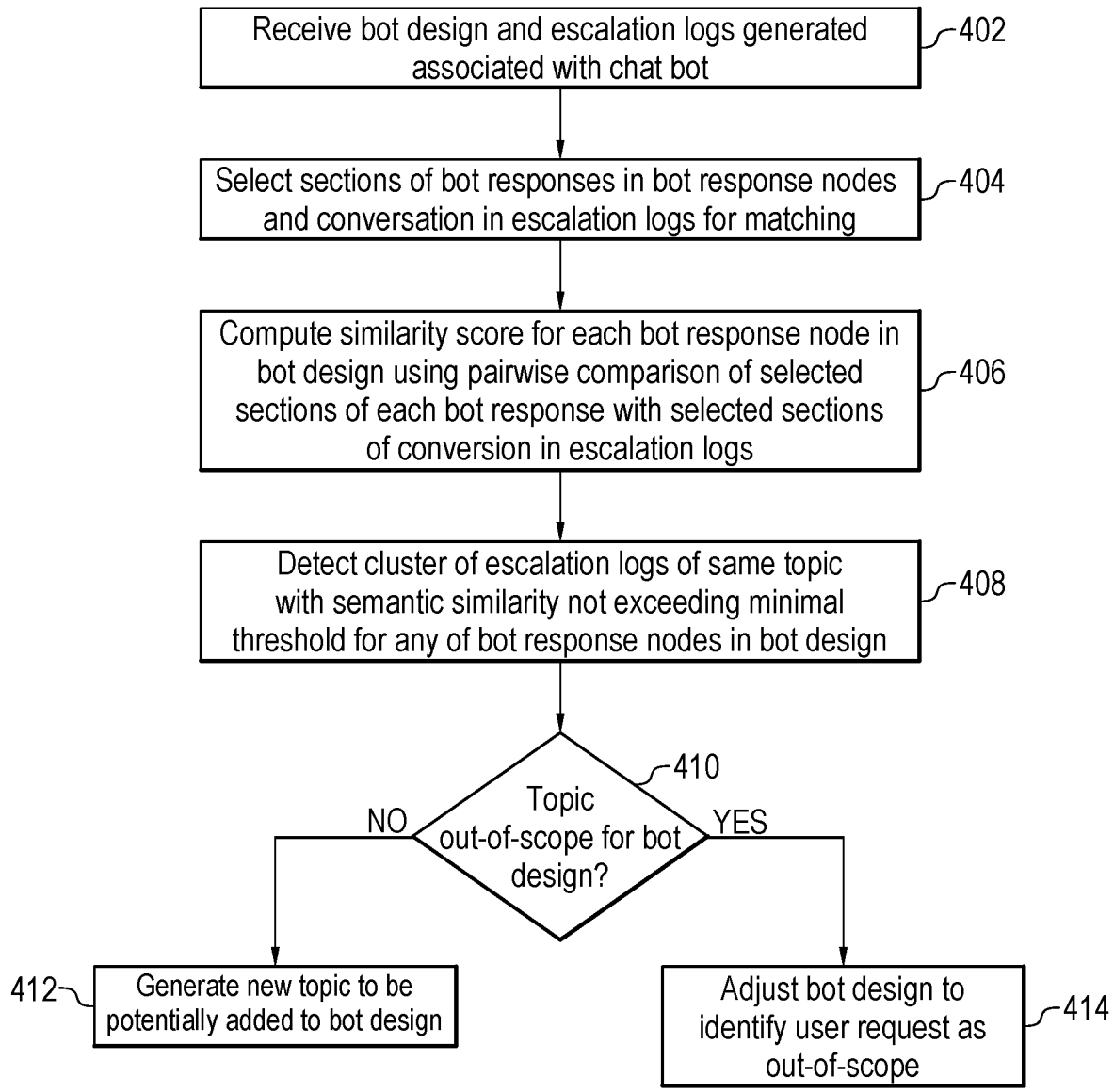
FIG. 4 is a block diagram of an example method that can modify a chat bot design based on clustering of escalation logs.

FIG. 4 is a process flow diagram of an example method that can modify a chat bot design based on clustering of escalation logs. The method 400 can be implemented with any suitable computing device, such as the computing device 500 of FIG. 5 and is described with reference to the system 200 of FIG. 2. For example, the method 400 described below can be implemented by the processor 502 or the processor 802 of FIGS. 5 and 8.

At block 402, a processor receives a bot design and escalation logs associated with a chat bot. For example, the chat bot may have been configured based on the bot design.

At block 404, the processor selects sections of bot responses in bot response nodes and conversation in escalation logs for matching. For example, the processor can select sections of the bot design that include the first sentence or paragraph of each bot response, or an entire bot response. In some examples, the processor can select sections of conversation in each escalation log based on speaker, or the first sentence. In various examples, the processor can filter fluff utterances from the conversations.

For example, the selection portion of the conversations may be the first sentence of the user and all the filtered or unfiltered responses of an agent.

At block 406, the processor computes a similarity score for each bot response node in the bot design using a pairwise comparison of selected sections of each bot response with selected sections of conversion in the escalation logs. For example, each selected section of each bot response may be paired with each selected section of conversation in each of the escalation logs. Thus, the processor can generate a similarity score for each bot response and escalation log combination. In various examples, the similarity score may be a value ranging from zero to one. In various examples, the processor may compute a full semantic similarity between each of a number of bot response nodes in the bot design and the escalation logs. In some examples, the processor can compute a conversation to first-node-sentence semantic similarity. In various examples, the processor can compute a fusion of a full semantic similarity and a conversation to first-node-sentence semantic similarity between each of a number of bot response nodes in the bot design and the escalation logs.

At block 408, the processor detects a cluster of escalation logs of a same topic with a semantic similarity not exceeding a minimal threshold for any of bot response nodes in the bot design. For example, the processor can cluster the escalation logs using any suitable clustering technique, such as K-Means, Mean-Shift, DBSCAN, or any other suitable custom solutions.

At decision diamond 410, the processor determines whether a topic is out-of-scope for the bot design. For example, the processor may send out the topic for review and receive a label of in-scope or out-of-scope for the topic. If the processor detects that the topic is not out-of-scope for the bot design, then the method may continue at block 414. If the processor detects that the topic is out-of-scope for the bot design, then the method may continue at block 414.

At block 412, the processor generates new topics to be potentially added to the bot design. For example, the processor can generate new topics to be potentially added to the bot design in response to detecting that a cluster of escalation logs of the same topic have a semantic similarity score not exceeding a threshold for any of the bot response nodes in the bot design and that the new topic is not out-of-scope for the bot design. In various examples, a subset of the generated topics can then be selected for inclusion in the bot design. For example, the processor may receive a selected list of topics to be included in the bot design after sending out a list of suggested topics to be potentially added.

At block 414, the processor adjusts the bot design to identify a user request as out-of-scope. For example, the processor can adjust the bot design to identify a user request as out-of-scope in response to detecting that a cluster of escalation logs of the same topic have a semantic similarity score not exceeding a threshold for any of the bot response nodes in the bot design and that the new topic is out-of-scope for the bot design.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
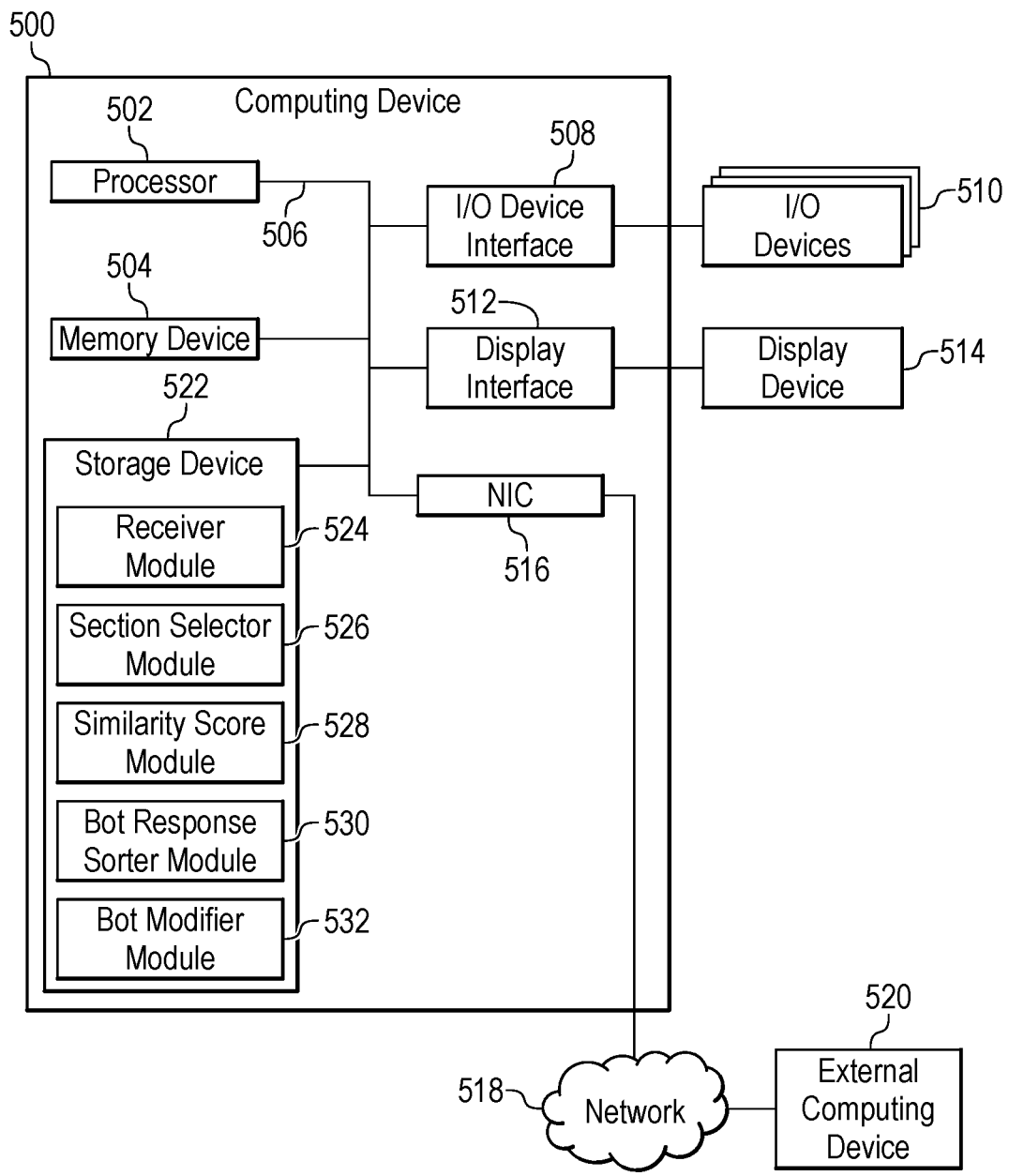
FIG. 5 is a block diagram of an example computing device that can modify chat bot design based using escalation logs.

FIG. 5 is block diagram of an example computing device that can modify chat bot design based using escalation logs. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514.

The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, a section selector module 526, a similarity score module 528, a bot response sorter module 530, and a bot modifier module 532. The receiver module 524 can receive a bot design and escalation logs associated with a chat bot configured based on the bot design. The section selector module 526 can filter out fluff utterances via a classifier trained on training data associated with the bot design. In various examples, the section selector module 526 can select portions of the escalation logs for computing the similarity score including filtered agent side utterances and a first user utterance to the agent. The similarity score module 528 can compute a similarity score between each of a number of bot response nodes in the bot design and the escalation logs. For example, the similarity score may be a pairwise calculated semantic similarity score between each bot response node and each of the escalation logs. In some examples, the pairwise calculated similarity score may be calculated using selected portions of the bot design or selected portions of the escalation logs, or both. In various examples, the similarity score module 528 can compute an accumulative similarity score for each of the bot response nodes by summing together pairwise similarity scores computed between each bot response node and the escalation logs. The response sorter module 530 can generate a sorted list of the bot response nodes in the bot design based on the similarity scores. The bot modifier module 532 can flag a bot response node in the bot design in response to detecting that the similarity score between a response node and an escalation log exceeds a threshold. In some examples, the bot modifier module 532 can cluster the escalation logs based on topic and modify the bot design to include a generated topic in response to detecting that a cluster of escalation logs does not exceed a second threshold lower than the threshold and detecting that the generated topic is not out-of-scope. For example, the bot modifier module 532 may receive an indication that the generated topic is not out-of-scope. In various examples, the bot modifier module 532 may receive domain-specific documentation, and records related to processes, to facilitate modification decisions.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the receiver module 524, the section selector module 526, the similarity score module 528, the bot response sorter module 530, and the bot modifier module 532 may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, the section selector module 526, the similarity score module 528, the bot response sorter module 530, and the bot modifier module 532 can be implemented with logic, wherein the logic, as referred to herein, can include any suitable hardware (e.g., a processor, among others), software (e.g., an application, among others), firmware, or any suitable combination of hardware, software, and firmware.

Figure 6:
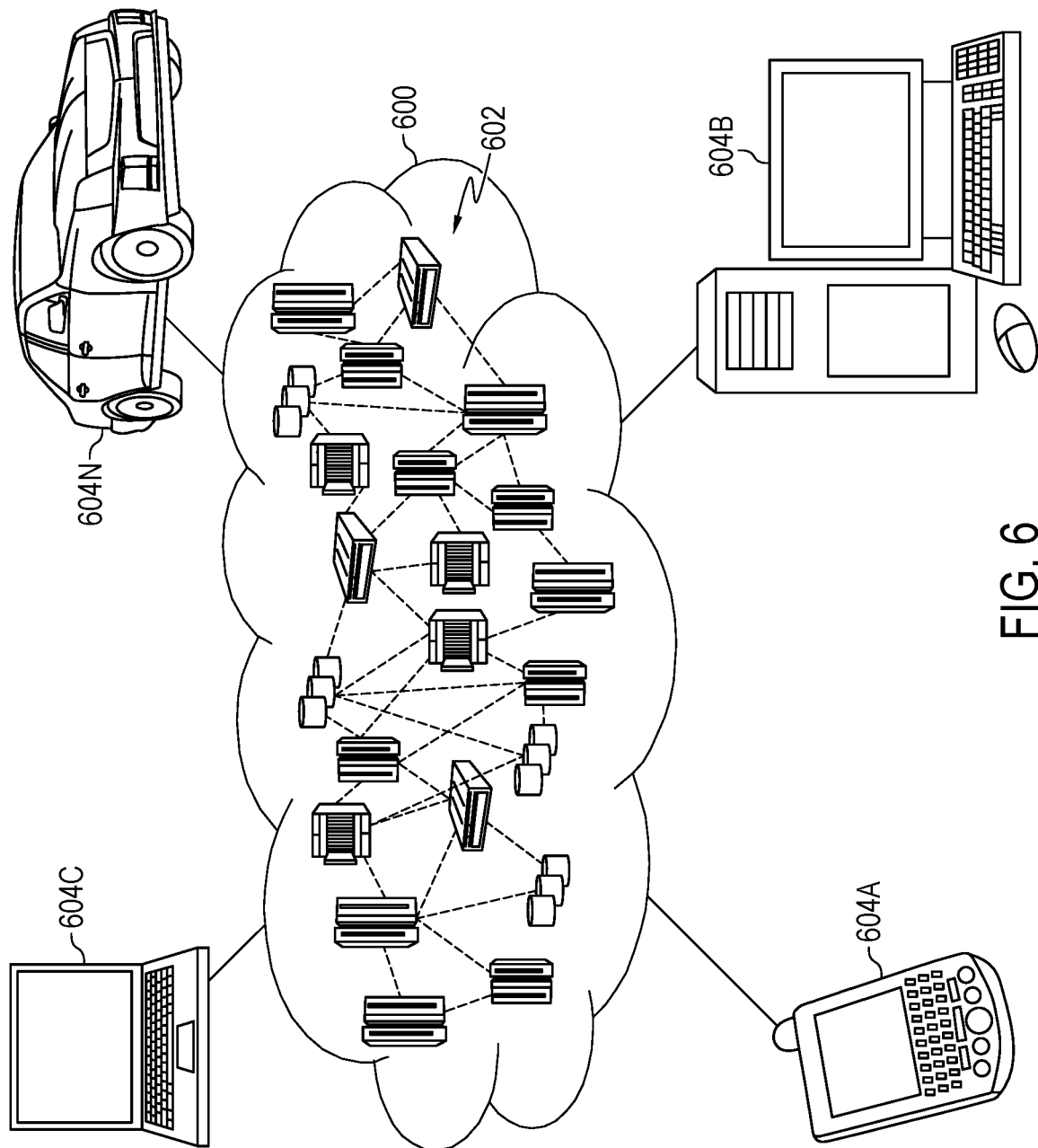
FIG. 6 is a diagram of an example cloud computing environment according to embodiments described herein.

Referring now to FIG. 6, illustrative cloud computing environment 600 is depicted. As shown, cloud computing environment 600 includes one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
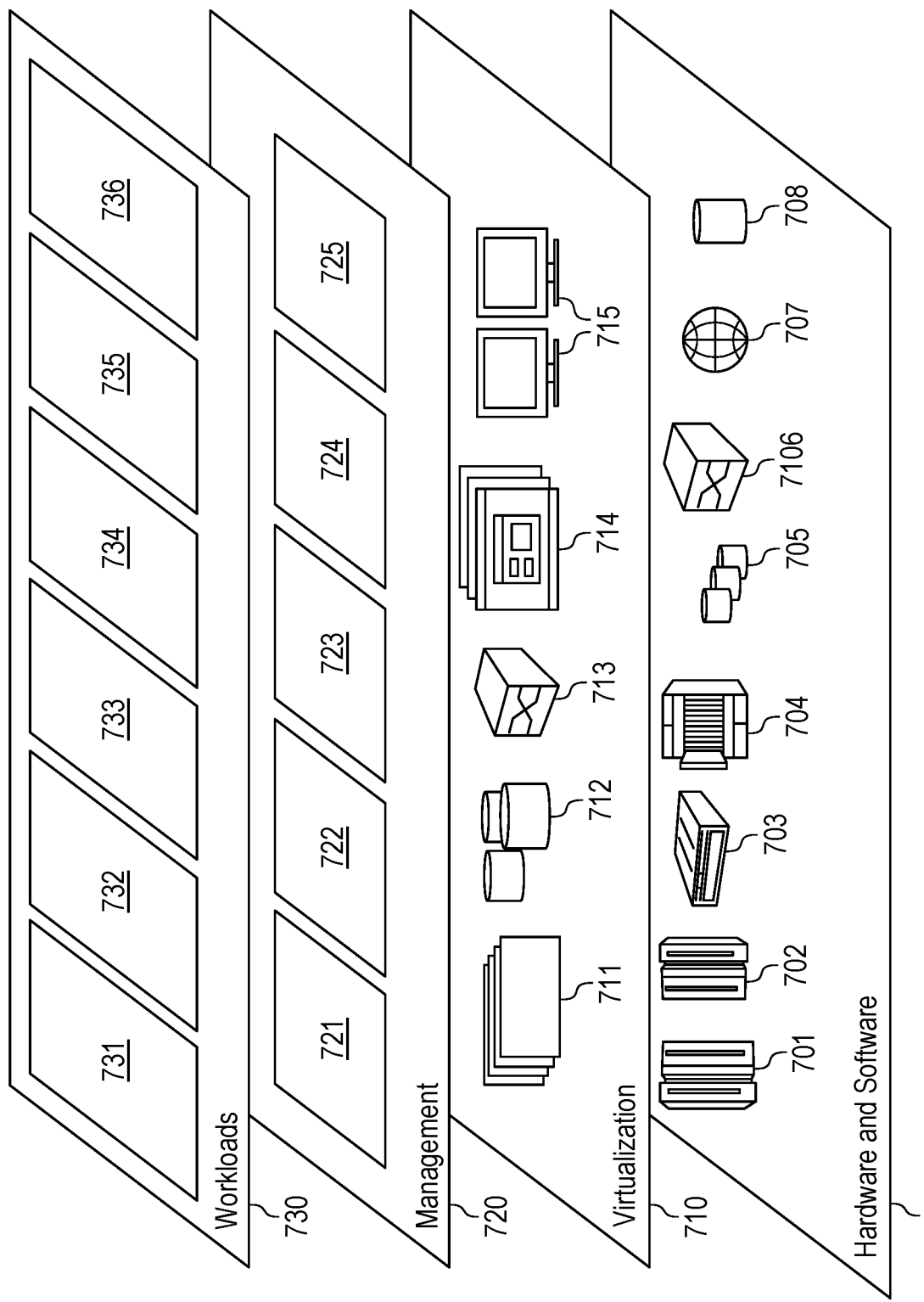
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include: mainframes 701; RISC (Reduced Instruction Set Computer) architecture based servers 702; servers 703; blade servers 704; storage devices 705; and networks and networking components 706. In some embodiments, software components include network application server software 707 and database software 708.

Virtualization layer 710 provides an abstraction layer from which the following examples of virtual entities may be provided: virtual servers 711; virtual storage 712; virtual networks 713, including virtual private networks; virtual applications and operating systems 714; and virtual clients 715.

In one example, management layer 720 may provide the functions described below. Resource provisioning 721 provides dynamic procurement of computing resources and other resources that are utilized to perform tasks within the cloud computing environment. Metering and Pricing 722 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 723 provides access to the cloud computing environment for consumers and system administrators. Service level management 724 provides cloud computing resource allocation and management such that required service levels are met. Service Level Agreement (SLA) planning and fulfillment 725 provide pre-arrangement for, and procurement of, cloud computing resources for which a future requirement is anticipated in accordance with an SLA.

Workloads layer 730 provides examples of functionality for which the cloud computing environment may be utilized. Examples of workloads and functions which may be provided from this layer include: mapping and navigation 731; software development and lifecycle management 732; virtual classroom education delivery 733; data analytics processing 734; transaction processing 735; and chat bot analysis 736.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
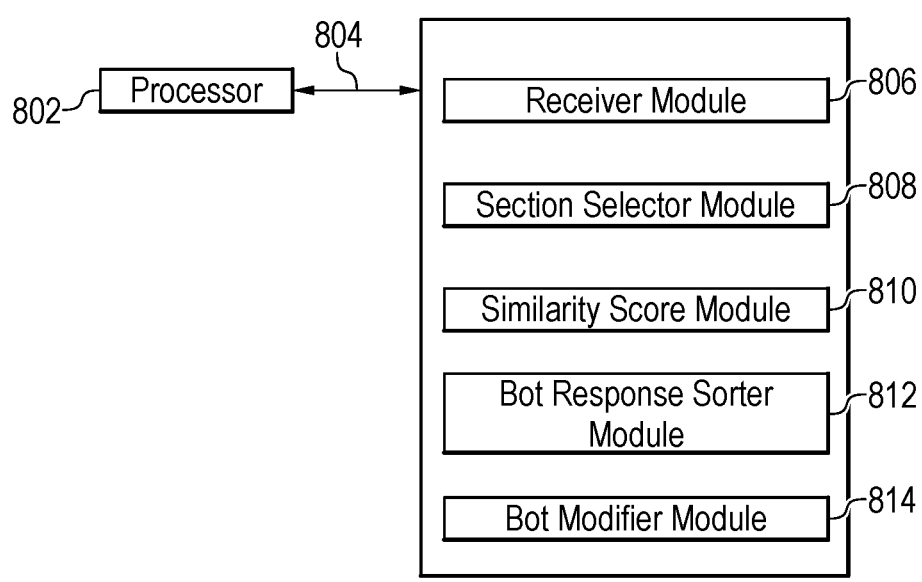
FIG. 8 is an example tangible, non-transitory computer-readable medium that can modify chat bot design based using escalation logs.

Referring now to FIG. 8, a block diagram is depicted of an example tangible, non-transitory computer-readable medium 800 that can modify chat bot design based using escalation logs. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 300 and 400.

The various software components discussed herein may be stored on the tangible, non-transitory, computer-readable medium 800, as indicated in FIG. 8. For example, a receiver module 806 includes code to receive a bot design and escalation logs associated with a chat bot configured based on the bot design. A section selector module 808 includes code to select sections of conversations in escalation logs for matching. A similarity score module 810 includes code to compute a similarity score between each of a number of bot response nodes in the bot design and the escalation logs. The module 810 also includes code to. A bot response sorter module 812 includes code to sort the bot responses by the accumulated similarity score generate a sorted list of the bot response nodes. A bot modifier module 814 includes code to flag a bot response for modification in response to detecting that the accumulative score of the bot response exceeds a threshold score. In various examples, the bot modifier module 814 includes code to generate a new topic to be potentially added to the bot design in response to detecting that a cluster of escalation logs of the same topic have a semantic similarity score not exceeding a threshold for any of the bot response nodes in the bot design and modify the bot design to include the new topic in response to detecting that the new topic is not out-of-scope for the bot design. For example, the bot modifier module 814 may send the generate topic out for review and receive an indication that that the new topic is not out-of-scope for the bot design. In some examples, the bot modifier module 814 includes code to adjust the bot design to identify a user request as out-of-scope in response to detecting that a cluster of escalation logs of the same topic have a semantic similarity score not exceeding a threshold for any of the bot response nodes in the bot design and that the new topic is out-of-scope for the bot design.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive a bot design and escalation logs associated with a chat bot configured based on the bot design;
   compute a similarity score between each bot response node of a plurality of bot response nodes in the bot design and each escalation log of the escalation logs;
   generate a sorted list of the plurality of bot response nodes in the bot design based on the similarity scores of the plurality of bot response nodes in the bot design and the escalation logs;
   tune, in response to the similarity score indicating a failure of the chat bot, an intent detection component of the chat bot to correctly handle a user query by transferring a user to a correct bot response node of the plurality of bot response nodes in the bot design in response to adjusting the bot design to incorporate new topics identified from clustered escalation logs and to refine existing user intents based on flagged bot response nodes of the plurality of bot response nodes in the bot design; and
   execute the chat bot with the adjusted bot design to successfully complete a conversation with the user without escalation.

2. The system of claim 1, wherein the processor is further to flag a bot response node in the bot design in response to detecting that the similarity score between a bot response node and an escalation log exceeds a threshold score.

3. The system of claim 2, wherein the processor is further to cluster the escalation logs based on topic and modify the bot design to include a generated topic in response to detecting that a cluster of escalation logs does not exceed another threshold score lower than the threshold score and detecting that the generated topic is not out-of-scope for the bot design.

4. The system of claim 1, wherein the processor is further to filter out fluff utterances via a classifier trained on training data associated with the bot design.

5. The system of claim 1, wherein the processor is further to select portions of the escalation logs for computing the similarity score comprising filtered agent side utterances and a first user utterance to an agent.

6. The system of claim 1, wherein the processor is further to compute an accumulative similarity score for each bot response node of the plurality of bot response nodes in the bot design by summing together pairwise similarity scores computed between each bot response node of the plurality of bot response nodes in the bot design and each escalation log of the escalation logs.

7. The system of claim 1, wherein the similarity score comprises a pairwise calculated semantic similarity score between each bot response node of the plurality of bot response nodes in the bot design and each escalation log of the escalation logs.

8. A computer-implemented method, comprising:
   receiving, via a processor, a bot design and escalation logs associated with a chat bot configured based on the bot design;
   selecting, via the processor, sections of conversations in the escalation logs for matching;
   computing, via the processor, a similarity score between each bot response node of a plurality of bot response nodes in the bot design and each escalation log of the escalation logs;
   sorting, via the processor, the plurality of bot response nodes in the bot design by the similarity scores of the plurality of bot response nodes in the bot design and the escalation logs to generate a sorted list of the plurality of bot response nodes in the bot design;
   tuning, via the processor and in response to the similarity score indicating a failure of the chat bot, an intent detection component of the chat bot to correctly handle a user query by transferring a user to a correct bot response node of the plurality of bot response nodes in the bot design in response to adjusting the bot design to incorporate new topics identified from clustered escalation logs and to refine existing user intents based on flagged bot response nodes of the plurality of bot response nodes in the bot design; and
   executing, via the processor, the chat bot with the adjusted bot design to successfully complete a conversation with the user without escalation.

9. The computer-implemented method of claim 8, further comprising filtering, via the processor, fluff utterances from the conversations in the escalation logs.

10. The computer-implemented method of claim 8, wherein selecting the sections of conversations in the escalation logs comprises selecting a first user utterance and agent utterances.

11. The computer-implemented method of claim 8, further comprising selecting, via the processor, a portion of bot response nodes in the plurality of bot response nodes in the bot design for matching.

12. The computer-implemented method of claim 8, wherein computing the similarity score comprises computing a full semantic similarity between each bot response node of the plurality of bot response nodes in the bot design and the escalation logs.

13. The computer-implemented method of claim 8, wherein computing the similarity score comprises computing a conversation to first-node-sentence semantic similarity.

14. The computer-implemented method of claim 8, wherein computing the similarity score comprises computing a fusion of a full semantic similarity and a conversation to first-node-sentence semantic similarity between each bot response node of the plurality of bot response nodes in the bot design and the escalation logs.

15. The computer-implemented method of claim 8, further comprising flagging, via the processor, a bot response node for modification in response to detecting that the similarity scores of the plurality of bot response nodes in the bot design exceeds a threshold score.

16. The computer-implemented method of claim 8, further comprising generating, via the processor, a new topic to be added to the bot design in response to detecting that a cluster of escalation logs of a same topic have a semantic similarity score not exceeding a threshold score for any bot response node of the plurality of bot response nodes in the bot design and that the new topic is not out-of-scope for the bot design.

17. The computer-implemented method of claim 8, further comprising adjusting, via the processor, the bot design to identify a user request as out-of-scope for the bot design in response to detecting that a cluster of escalation logs of a same topic have a semantic similarity score not exceeding a threshold score for any bot response node of the plurality of bot response nodes in the bot design and that a new topic is out-of-scope for the bot design.

18. A computer program product for sorting bot response nodes, the computer program product comprising a computer readable storage medium having program code embodied therewith, wherein the computer readable storage medium is not a transitory signal per se, the program code executable by a processor to cause the processor to:
- receive a bot design and escalation logs associated with a chat bot configured based on the bot design;
- select sections of conversations in the escalation logs for matching;
- compute a similarity score between each bot response node of a plurality of bot response nodes in the bot design and each escalation log of the escalation logs;
- sort the plurality of bot response nodes in the bot design by the similarity scores of the plurality of bot response nodes in the bot design and the escalation logs to generate a sorted list of the plurality of bot response nodes in the bot design;
- tune, in response to the similarity score indicating a failure of the chat bot, an intent detection component of the chat bot to correctly handle a user query by transferring a user to a correct bot response node of the plurality of bot response nodes in the bot design in response to adjusting the bot design to incorporate new topics identified from clustered escalation logs and to refine existing user intents based on flagged bot response nodes of the plurality of bot response nodes in the bot design; and
- execute the chat bot with the adjusted bot design to successfully complete a conversation with the user without escalation.

19. The computer program product of claim 18, further comprising program code executable by the processor to cause the processor to flag a bot response node for modification in response to detecting that the similarity score of the plurality of bot response nodes in the bot design exceeds a threshold score.

20. The computer program product of claim 18, further comprising program code executable by the processor to generate a new topic to be added to the bot design in response to detecting that a cluster of escalation logs of a same topic have a semantic similarity score not exceeding a threshold score for any bot response node of the plurality of bot response nodes in the bot design and that the new topic is not out-of-scope for the bot design.

* * * * *